United States Patent
Oh et al.

(10) Patent No.: US 7,991,621 B2
(45) Date of Patent: Aug. 2, 2011

(54) METHOD AND AN APPARATUS FOR PROCESSING A SIGNAL

(75) Inventors: Hyen O Oh, Seoul (KR); Jeong Ook Song, Seoul (KR); Chang Heon Lee, Seoul (KR); Yang Won Jung, Seoul (KR); Hong Goo Kang, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 209 days.

(21) Appl. No.: 12/497,375

(22) Filed: Jul. 2, 2009

(65) Prior Publication Data

US 2010/0070284 A1 Mar. 18, 2010

Related U.S. Application Data

(63) Continuation of application No. PCT/KR2009/001050, filed on Mar. 3, 2009.

(60) Provisional application No. 61/033,032, filed on Mar. 3, 2008.

(51) Int. Cl.
*G10L 19/00* (2006.01)

(52) U.S. Cl. ............ 704/500; 704/229; 704/200.1; 84/706; 84/629; 381/11; 381/13; 381/2; 381/61

(58) Field of Classification Search .......... 704/500–504, 704/226, 230, 203, 229, 201; 341/143; 455/205, 455/228, 45; 84/706, 629

See application file for complete search history.

(56) References Cited

U.S. PATENT DOCUMENTS

| | | | | |
|---|---|---|---|---|
| 4,354,415 A | * | 10/1982 | Sonnabend | 84/706 |
| 4,628,529 A | * | 12/1986 | Borth et al. | 381/94.3 |
| 5,285,498 A | * | 2/1994 | Johnston | 381/2 |
| 5,692,102 A | * | 11/1997 | Pan | 704/230 |
| 5,706,396 A | * | 1/1998 | Schroder et al. | 704/228 |
| 5,778,335 A | | 7/1998 | Ubale et al. | |
| 6,011,824 A | * | 1/2000 | Oikawa et al. | 375/377 |
| 6,092,041 A | * | 7/2000 | Pan et al. | 704/229 |
| 6,208,962 B1 | | 3/2001 | Ozawa | |
| 2009/0044231 A1 | * | 2/2009 | Oh et al. | 725/62 |
| 2009/0234645 A1 | * | 9/2009 | Bruhn | 704/205 |

FOREIGN PATENT DOCUMENTS

EP 1 688 917 A1 8/2006
WO WO-02/05433 A1 1/2002

* cited by examiner

*Primary Examiner* — Vijay B Chawan
(74) *Attorney, Agent, or Firm* — Birch, Stewart, Kolasch & Birch, LLP (57) ABSTRACT

An apparatus for processing an encoded signal and method thereof are disclosed, by which an audio signal can be compressed and reconstructed in higher efficiency.

An audio signal processing method includes the steps of identifying whether a type of an audio signal is a music using first type information, if the type of the audio signal is not the music signal, identifying whether the type of the audio signal is a speech signal or a mixed signal using second type information, and if the type of the audio signal is determined as either the speech signal or the mixed signal, reconstructing the audio signal according to a coding scheme applied per frame using coding identification information. If the type of the audio signal is the music signal, the first type information is received only. If the type of the audio signal is the speech signal or the mixed signal, both of the first type information and the second type information are received.

Accordingly, various kinds of audio signals can be encoded/decoded in higher efficiency.

15 Claims, 9 Drawing Sheets

METHOD AND AN APPARATUS FOR PROCESSING A SIGNAL

This application is a Continuation of copending PCT International Application No. PCT/KR2009/001050 filed on Mar. 3, 2009, which designated the United States, and on which priority is claimed under 35 U.S.C. §120, and which also claims priority under 35 U.S.C. §119(e) on Patent Application No. 61/033,032 filed in United States of America on Mar. 3, 2008. The entire contents of each of the above documents is hereby incorporated by reference.

BACKGROUND OF THE INVENTION

1. Field of the Invention

The present invention relates to an audio signal processing apparatus for encoding and decoding various kinds of audio signals effectively and method thereof.

2. Discussion of the Related Art

Generally, coding technologies are conventionally classified into two types such as perceptual audio coders and linear prediction based coders. For instance, the perceptual audio coder optimized for music adopts a scheme of reducing an information size in a coding process using the masking principle, which is human aural psychoacoustic theory, on a frequency axis. On the contrary, the linear prediction based coder optimized for speech adopts a scheme of reducing an information size by modeling speech vocalization on a time axis.

However, each of the above-described technologies has good performance on each optimized audio signal (e.g., a speech signal, a music signal) but fails to provide consistent performance on an audio signal generated from complicatedly mixing different types of audio signals or speech and music signals together.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which different types of audio signals can be compressed and/or reconstructed by higher efficiency.

Another object of the present invention is to provide an audio coding scheme suitable for characteristics of an audio signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

In the present invention, terminologies in the present invention can be construed as the following references. First of all, 'coding' can be occasionally construed as encoding or decoding. Information is a terminology that includes values, parameters, coefficients, elements and the like.

Regarding the present invention, 'audio signal' in the present invention is conceptionally discriminated from a video signal. And, the audio signal indicates all signals that can be aurally identified in reproduction. Therefore, audio signals can be classified into a speech signal mainly relevant to human vocalization or a signal similar to the speech signal (hereinafter named 'speech signal'), a music signal mainly relevant to a mechanical noise and sound or a signal similar to the music signal (hereinafter named 'music signal'), and a 'mixed signal' generated from mixing the speech signal and the music signal together. The present invention intends to provide an apparatus for encoding/decoding the above three types of audio signals and method thereof in order to encode/decode the audio signals to be suitable for characteristics of the audio signals. Yet, the audio signals are classified for the description of the present invention only. And, it is apparent that the technical idea of the present invention is identically applicable to a case of classifying the audio signal according to a different method.

Figure 1:
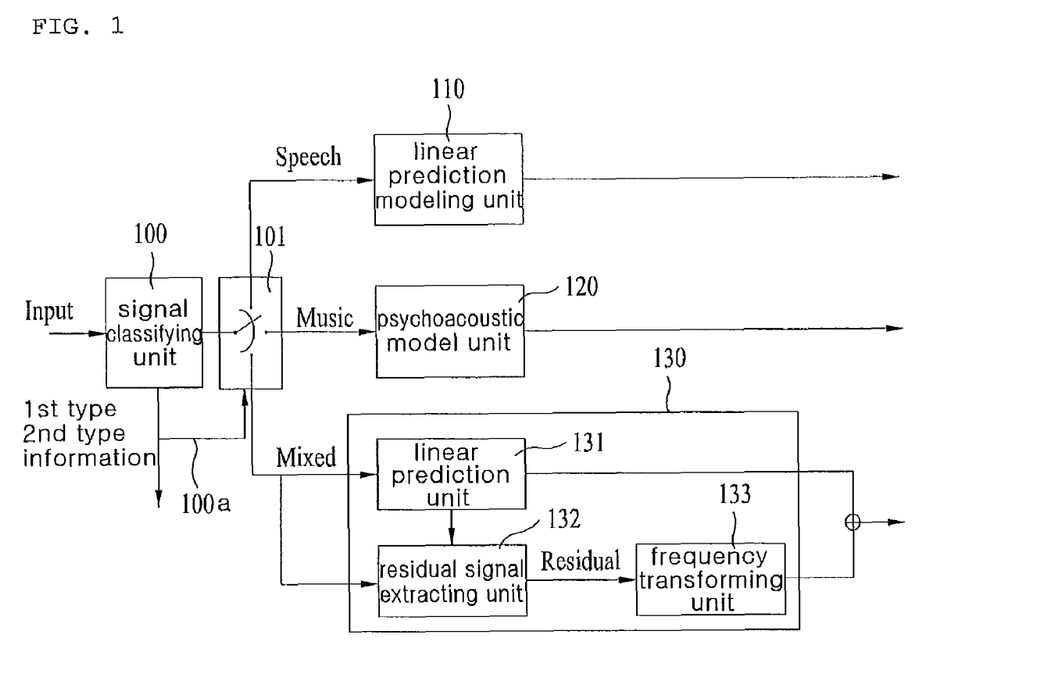
FIG. 1 is a block diagram of an audio coding apparatus according to one preferred embodiment of the present invention.

FIG. 1 is a block diagram of an audio coding apparatus according to one preferred embodiment of the present invention. In particular, FIG. 1 shows a process of classifying an inputted audio signal according to a preset reference and then coding the classified audio signal by selecting an audio coding scheme suitable for the corresponding audio signal.

Referring to FIG. 1, an audio coding apparatus according to one preferred embodiment of the present invention includes a signal classifying unit (sound activity detector) 100 classifying an inputted audio signal into a type of a speech signal, a music signal or a mixed signal of speech and music by analyzing a characteristic of the inputted audio signal, a linear prediction modeling unit 110 coding the speech signal of the signal type determined by the signal classifying unit 100, a psychoacoustic model unit 120 coding the music signal, and a mixed signal modeling unit 130 coding the mixed signal of speech and music. And, the audio coding apparatus can further include a switching unit 101 configured to select a coding scheme suitable for the audio signal classified by the signal classifying unit 100. The switching unit 101 is operated using audio signal coding type information (e.g., first type information and second type information, which will be explained in detail with reference to FIG. 2 and FIG. 3) generated by the signal classifying unit 100 as a control signal. Moreover, the mixed signal modeling unit 130 can include a linear prediction unit 131, a residual signal extracting unit 132 and a frequency transforming unit 133. In the following description, the respective elements shown in FIG. 1 are explained in detail.

First of all, the signal classifying unit 100 classifies a type of an inputted audio signal and then generates a control signal to select an audio coding scheme suitable for the classified type. For instance, the signal classifying unit 100 classifies whether an inputted audio signal is a music signal, a speech signal or a mixed signal of speech and music. Thus, the type of the inputted audio signal is classified to select an optimal coding scheme per audio signal type from audio coding schemes which will be explained later. Therefore, the signal classifying unit 100 performs a process of analyzing an inputted audio signal and then selecting an audio coding scheme optimal for the inputted audio signal. For instance, the signal classifying unit 100 generates audio coding type information by analyzing an inputted audio signal. The generated audio coding type information is utilized as a reference for selecting a coding scheme. The generated audio coding type information is included as a bitstream in a finally-coded audio signal and is then transferred to a decoding or receiving device. Besides, a decoding method and apparatus using the audio coding type information will be explained in detail with reference to FIG. 8 and FIG. 11. Moreover, the audio coding type information generated by the signal classifying unit 100 can include first type information and second type information for example. This will be described with reference to FIG. 2 and FIG. 3.

The signal classifying unit 100 determines an audio signal type according to a characteristic of an inputted audio signal. For instance, if the inputted audio signal is a signal better for modeling with a specific coefficient and a residual signal, the signal classifying unit 100 determines the inputted audio signal as a speech signal. If the inputted audio signal is a signal poor for modeling with a specific coefficient and a residual signal, the signal classifying unit 100 determines the inputted audio signal as a music signal. If it is difficult to determine the inputted audio signal as a speech signal or a music signal, the signal classifying unit 100 determines the inputted audio signal as a mixed signal. Regarding a detailed determination reference, for example, when the signal is modeled with a specific coefficient and a residual signal, if an energy level ratio of the residual signal to the signal is smaller than a preset reference value, the signal can be determined as a signal good for modeling. Therefore, the signal can be determined as a speech signal. If the signal has high redundancy on a time axis, the signal can be determined as a signal good for modeling by linear prediction for predicting a current signal from a past signal. Therefore, the signal can be determined as a music signal.

If a signal inputted according to this reference is determined as a speech signal, it is able to code an input signal using a speech coder optimized for the speech signal. According to the present embodiment, the linear prediction modeling unit 100 is used for a coding scheme suitable for a speech signal. The linear prediction modeling unit 100 is provided with various schemes. For instance, ACELP (algebraic code excited linear prediction) coding scheme, AMR (adaptive multi-rate) coding scheme or AMR-WB (adaptive multi-rate wideband) coding scheme is applicable to the linear prediction modeling unit 110.

The linear prediction modeling unit 110 is able to perform linear prediction coding on an inputted audio signal by frame unit. The linear prediction modeling unit 110 extracts a predictive coefficient per frame and then quantizes the extracted predictive coefficient. For instance, a scheme of extracting a predictive coefficient using 'Levinson-Durbin algorithm' is widely used in general.

In particular, if an inputted audio signal is constructed with a plurality of frames or there exist a plurality of super frames, each of which has a unit of a plurality of frames, for example, it is able to determine whether to apply a linear prediction modeling scheme per frame. It is possible to apply a different linear prediction modeling scheme per unit frame existing within one super frame or per subframe of a unit frame. This can raise coding efficiency of an audio signal.

Meanwhile, if an inputted audio signal is classified into a music signal by the signal classifying unit 100, it is able to code an input signal using a music coder optimized for the music signal. According to the present embodiment, the psychoacoustic model unit 120 is used for a coding scheme suitable for a music signal. An example of the psychoacoustic model unit 120 applied to the present invention will be described in detail with reference to FIGS. 4 to 7.

If an inputted audio signal is classified into a mixed signal, in which speech and music are mixed together, by the signal classifying unit 100, it is able to code an input signal using a coder optimized for the mixed signal. According to the present embodiment, the mixed signal modeling unit 130 is used for a coding scheme suitable for a mixed signal.

The mixed signal modeling unit 130 is able to perform coding by a mixed scheme resulting from mixing the aforesaid linear prediction modeling scheme and the psychoacoustic modeling scheme together. In particular, the mixed signal modeling unit 130 performs linear prediction coding on an input signal, obtains a residual signal amounting to a difference between a linear prediction result signal and an original signal, and then codes the residual signal by a frequency transform coding scheme.

For instance, FIG. 1 shows an example that the mixed signal modeling unit 130 includes the linear prediction unit 131, the residual signal extracting unit 132 and the frequency transforming unit 133.

The linear prediction unit 131 performs linear predictive analysis on an inputted signal and then extracts a linear predictive coefficient indicating a characteristic of the signal. The residual signal extracting unit 132 extracts a residual signal, from which a redundancy component is removed, from the inputted signal using the extracted linear predictive coefficient. Since the redundancy is removed from the residual signal, the corresponding residual signal can have a type of a white noise. The linear prediction unit 131 is able to perform linear prediction coding on an inputted audio signal by frame unit. The linear prediction unit 131 extracts a predictive coefficient per frame and then quantizes the extracted predictive coefficient. For instance, in particular, if an inputted audio signal is constructed with a plurality of frames or there exist a plurality of super frames, each of which has a unit of a plurality of frames, it is able to determine whether to apply a linear prediction modeling scheme per frame. It is possible to apply a different linear prediction modeling scheme per unit frame existing within one super frame or per subframe of a unit frame. This can raise coding efficiency of an audio signal.

The residual signal extracting unit 132 receives an input of a remaining signal coded by the linear prediction unit 131 and an input of an original audio signal having passed through the signal classifying unit 100 and then extracts a residual signal that is a difference signal between the two inputted signals.

The frequency transforming unit 133 calculates a masking threshold or a signal-to-mask ratio (SMR) by performing frequency domain transform on an inputted residual signal by MDCT or the like and then codes the residual signal. The frequency transforming unit 133 is able to code a signal of a residual audio tendency using TCX as well as the psychoacoustic modeling.

As the linear prediction modeling unit 100 and the linear prediction unit 131 extract an audio characteristic reflected linear predictive coefficient (LPC) by performing linear prediction and analysis on an inputted audio signal, it is able to consider a scheme of using variable bits for a method of transferring the LPC data.

For instance, an LPC data mode is determined by considering a coding scheme per frame. It is then able to assign a linear predictive coefficient having a viable bit number per the determined LPC data mode. Through this, an overall audio bit number is reduced. Therefore, audio coding and decoding can be performed more efficiently.

Meanwhile, as mentioned in the foregoing description, the signal classifying unit 100 generates coding type information of an audio signal by classifying the audio signal into one of two types of the coding type information, enables the coding type information to be included in a bitstream, and then transfers the bitstream to a decoding apparatus. In the following description, audio coding type information according to the present invention is explained in detail with reference to FIG. 2 and FIG. 3.

Figure 2:
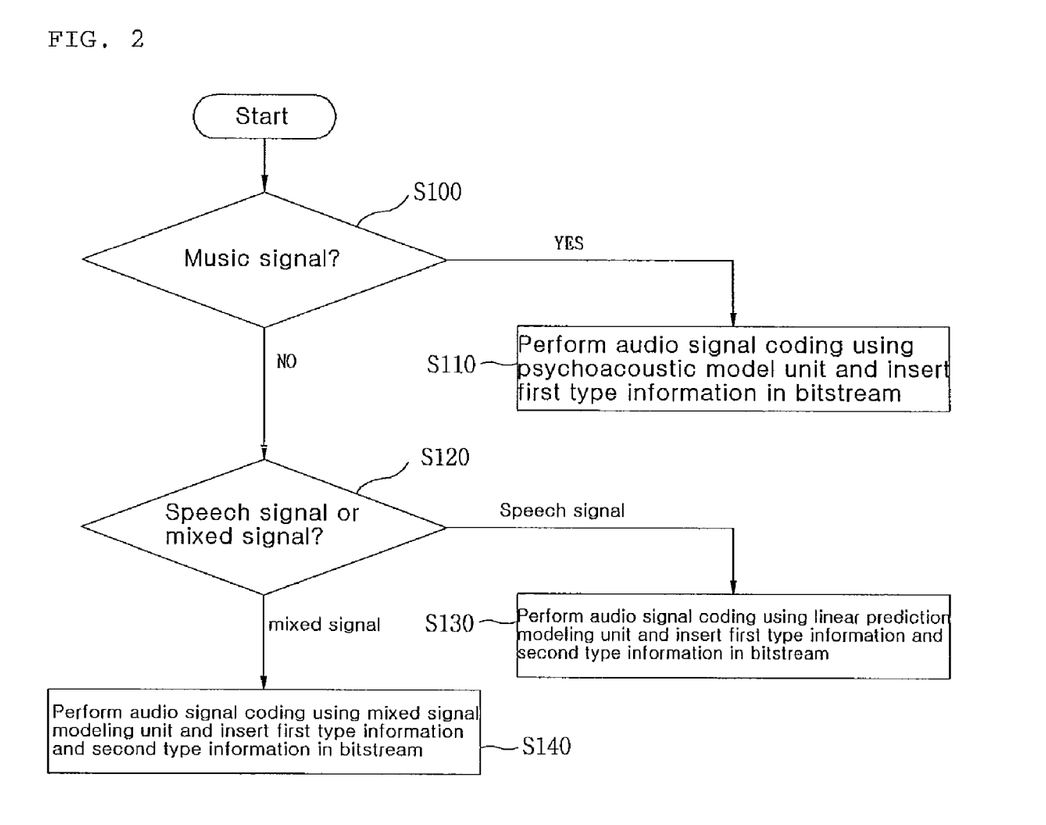
FIG. 2 is a flowchart for a method of coding an audio signal using audio type information according to one embodiment of the present invention.

FIG. 2 is a flowchart for a method of coding an audio signal using audio type information according to one preferred embodiment of the present invention.

Referring to FIG. 2, the present invention proposes a method of representing a type of an audio signal in a manner of using first type information and second type information for classification. For instance, if an inputted audio signal is determined as a music signal [S100], the signal classifying unit 100 controls the switching unit 101 to select a coding scheme (e.g., psychoacoustic modeling scheme shown in FIG. 2) suitable for the music signal and then enables coding to be performed according to the selected coding scheme [S110]. Thereafter, the corresponding control information is configured as first type information and is then transferred by being included in a coded audio bitstream. Therefore, the first type information plays a role as coding identification information indicating that a coding type of an audio signal is a music signal coding type. The first type information is utilized in decoding an audio signal according to a decoding method and apparatus.

Moreover, if the inputted signal is determined as a speech signal [S120], the signal classifying unit 100 controls the switching unit 101 to select a coding scheme (e.g., linear prediction modeling shown in FIG. 2) suitable for the speech signal and then enables coding to be performed according to the selected coding scheme [S130]. If the inputted signal is determined as a mixed signal [S120], the signal classifying unit 100 controls the switching unit 101 to select a coding scheme (e.g., mixed signal modeling shown in FIG. 2) suitable for the mixed signal and then enables coding to be performed according to the selected coding scheme [S140]. Subsequently, control information indicating either the speech signal coding type or the mixed signal coding type is configured into second type information. The second type is then transferred by being included in a coded audio bitstream together with the first type information. Therefore, the second type information plays a role as coding identification information indicating that a coding type of an audio signal is either a speech signal coding type or a mixed signal coding type. The second type information is utilized together with the aforesaid first type information in decoding an audio signal according to a decoding method and apparatus.

Regarding the first type information and the second type information, there are two cases according to characteristics of inputted audio signals. Namely, the first information needs to be transferred only or both of the first type information and the second type information need to be transferred. For instance, if a type of an inputted audio signal is a music signal coding type, the first type information is transferred only by being included in a bitstream and the second type information may not be included in the bitstream [(a) of FIG. 3]. Namely, the second type information is included in a bitstream only if an inputted audio signal coding type is a speech signal coding type or a mixed signal coding type. Therefore, it is able to prevent the unnecessary bit number to represent a coding type of an audio signal.

Although the example of the present invention teaches that the first type information indicates a presence or non-presence of a music signal type, it is just exemplary. And, it is apparent that the first type information is usable as information indicating a speech signal coding type or a mixed signal coding type. Thus, by utilizing an audio coding type having probability of high occurrence frequency according to a coding environment to which the present invention is applied, it is able to reduce an overall bit number of a bitstream.

Figure 3:
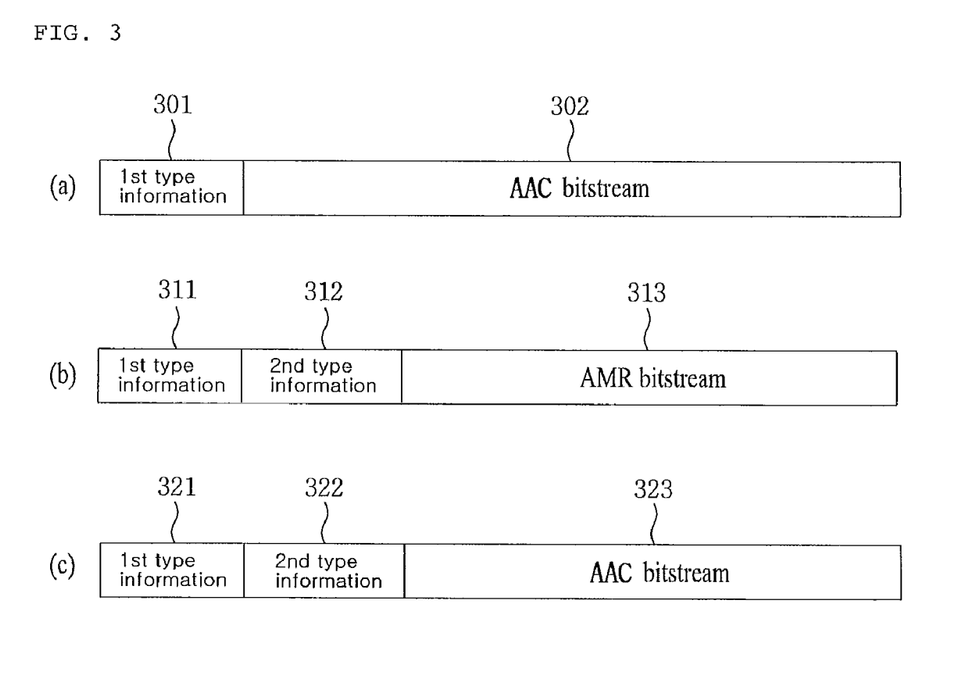
FIG. 3 is a diagram for an example of an audio bitstream structure coded according to the present invention.

FIG. 3 is a diagram for an example of an audio bitstream structure coded according to the present invention.

Referring to (a) of FIG. 3, an inputted audio signal corresponds to a music signal. First type information 301 is included in a bitstream only but second type information is not included therein. Within the bitstream, audio data coded by a coding type corresponding to the first type information 301 is included (e.g., AAC bitstream 302).

Referring to (b) of FIG. 3, an inputted audio signal corresponds to a speech signal. Both first type information 311 and second type information 312 are included in a bitstream. Within the bitstream, audio data coded by a coding type corresponding to the second type information 312 is included (e.g., AMR bitstream 313).

Referring to (c) of FIG. 3, an inputted audio signal corresponds to a mixed signal. Both first type information 321 and second type information 322 are included in a bitstream. Within the bitstream, audio data coded by a coding type corresponding to the second type information 322 is included (e.g., TCX applied AAC bitstream 323).

Regarding this description, the information included in an audio bitstream coded by the present invention is exemplarily shown in (a) to (c) of FIG. 3. And, it is apparent that various applications are possible within the range of the present invention. For instance, in the present invention, examples of AMR and AAC are taken as examples of coding schemes by adding information for identifying the corresponding coding schemes. Further, various coding schemes are applicable and coding identification information for identifying the various coding schemes are variously available as well. Besides, the present invention shown in (a) to (c) of FIG. 3 is applicable to one super frame, unit frame and subframe. Namely, the present invention is able to provide audio signal coding type information per preset frame unit.

As a preprocessing step of a coding process of an input signal using the linear prediction modeling unit 110, the psychoacoustic model unit 120 and the mixed signal modeling unit 130, a frequency band extending process (not shown in the drawing) may be performed. As example of the frequency band extending process, it is able to use SBR (spectral band replication) and HBE (high band extension) for generating a high frequency component in a bandwidth extension decoding unit using a low frequency component.

As a preprocessing step of a coding process of an input signal using the linear prediction modeling unit 110, the psychoacoustic model unit 120 and the mixed signal modeling unit 130, a channel extending process (not shown in the drawing) may be performed. The channel extending process is able to reduce a bit allocation size by coding channel information of an audio signal into side information. For example of the channel extending process, there is a channel extension extending unit such as PS (parametric stereo). In this case, the parametric stereo is a scheme of coding a stereo signal in a manner of downmixing a stereo signal into a mono signal.

According to one embodiment, if a 48 kHz stereo signal is transferred using SBR and PS (parametric stereo), a mono 24 kHz signal remains through the SBR/PS. This mono signal can be encoded by an encoder. Thus, the input signal of the encoder has 24 kHz. This is because a high frequency component is coded by SBR and is downsampled into a half of a previous frequency. Thus, input signal becomes the mono signal. This is because a stereo audio is extracted as a parameter through the PS (parametric stereo) to be changed into a sum of the mono signal and an additional audio.

A process for coding a music signal using a psychoacoustic model unit is explained with reference to the accompanying drawing as follows.

Figure 4:
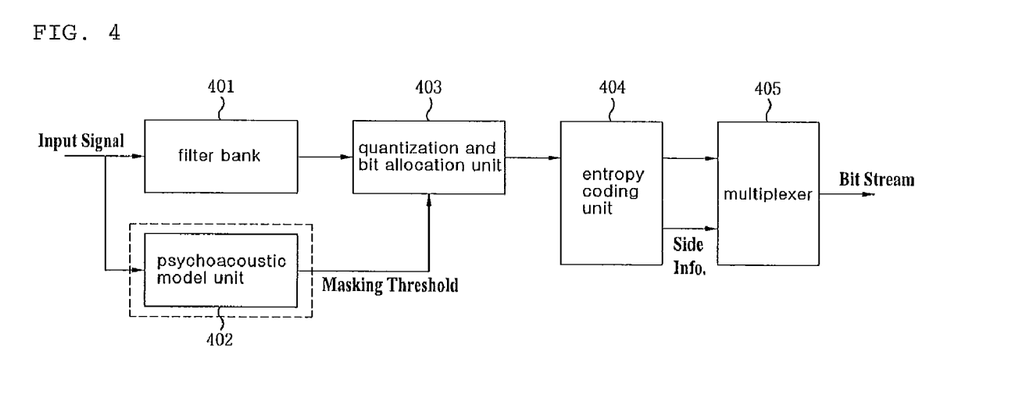
FIG. 4 is a block diagram of an audio coding apparatus using a psychoacoustic model according to one embodiment of the present invention.

FIG. 4 is a block diagram of an audio coding apparatus using a psychoacoustic model according to one embodiment of the present invention.

Referring to FIG. 4, an audio coding apparatus using a psychoacoustic model according to one embodiment of the present invention includes a filter bank (analysis filter bank) 401, a psychoacoustic model unit 402, a quantization and bit allocation unit 403, an entropy coding unit 404 and a multiplexer 405.

The filer bank 401 transforms an audio signal to a frequency-axis signal by performing MDCT (modified discrete cosine transform) to code an inputted audio signal that is a time-axis signal.

The psychoacoustic model unit 402 determines a size of a per-frequency maximum allowable quantization noise required for a bit allocation process by analyzing a perceptual characteristic of an inputted audio signal. The per-frequency maximum allowable quantization noise can be diagramed into a noise shaping reference. In particular, since the psychoacoustic model unit 402 analyzes a perceptual characteristic of an input signal on a frequency axis, a frequency transform process for an input signal is necessary. Although the frequency transform is performed by the filter bank 401 in an audio signal coding process, since test results of the psychoacoustic theory are mostly achieved on DFT (discrete Fourier transform) axis, it is preferable that FFT (fast Fourier transform) is performed. After the frequency-axis signal transforming process has been completed in the above manner, a noise shaping reference in a psychoacoustic model can be obtained by convolution between a frequency spectrum and a spreading function corresponding to each frequency component. An audio signal spectrum is quantized by calculating a difference between the noise shaping reference obtained by the psychoacoustic model and an input signal spectrum into perceptual entropy and then allocating bits properly.

The quantizing unit 403 quantizes a result object generated through 'loss coding' for removing a size of quantization noise located below the noise shaping reference determined by the psychoacoustic model unit 402 in the audio signal transformed into the frequency-axis signal by the filter bank 401. The quantizing unit 403 also allocates bits to the quantized signal. The bit allocating process is optimized in a manner that quantization noise generated from the quantizing process becomes smaller than a size of maximum allowable noise obtained from the psychoacoustic model in a given bitrate.

The entropy coding unit 404 maximizes a compression ratio of an audio signal by allocating a code to the audio signal quantized and bit-allocated by the quantizing unit 403 according to a use frequency. In particular, the compression efficiency is maximized by allocating a code in a manner of enabling an average code length to be closest to entropy. The basic principle lies in that an overall data size is reduced by representing each symbol or consecutive symbols as a code of a proper length according to a statistical occurrence frequency of data symbols. An average information size called 'entropy' is determined according to the occurrence probability of data symbol. An object of entropy coding is to enable an average code length per symbol to get closer to entropy.

The multiplexer 405 receives audio data compressed with high efficiency and side information from the entropy coding unit 404 and then transfers an audio data stream to a decoder of a receiving side.

Figure 5:
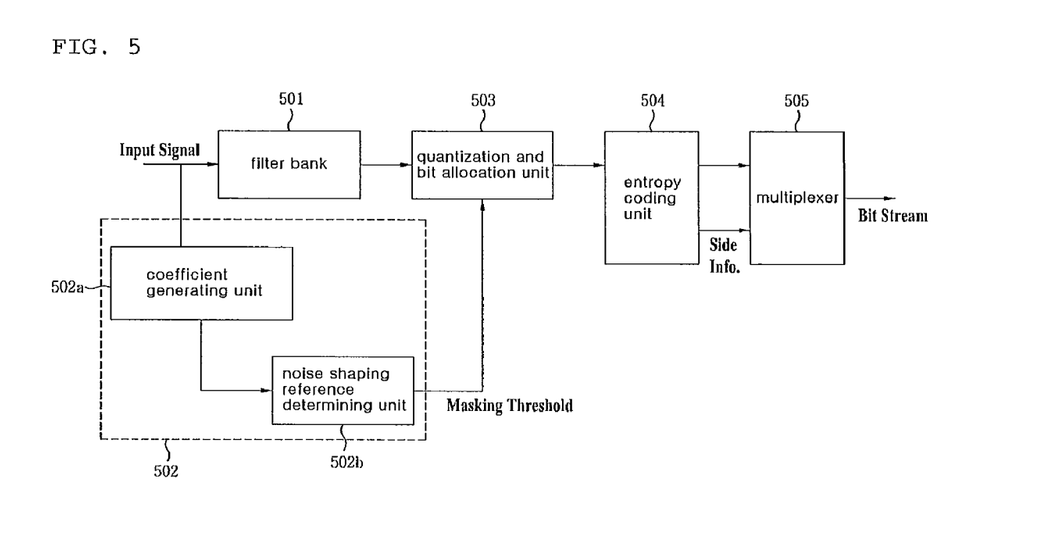
FIG. 5 is a block diagram of an audio coding apparatus using a psychoacoustic model according to another embodiment of the present invention.

FIG. 5 is a block diagram of an audio coding apparatus using a psychoacoustic model according to another embodiment of the present invention.

Referring to FIG. 5, an audio coding apparatus using a psychoacoustic model according to another embodiment of the present invention includes a filter bank (analysis filter bank) 501, a psychoacoustic model unit 502, a quantization and bit allocation unit 503, an entropy coding unit 504 and a multiplexer 505. Specifically, the psychoacoustic model unit 502 includes a coefficient generating unit 502a and a noise shaping reference determining unit 502b.

In order to remove statistical redundancy of an audio signal, the filer bank 501 transforms an audio signal to a subband sample. The filter bank 501 transforms an audio signal into a frequency-axis signal by performing MDCT (modified discrete cosine transform) to code an inputted audio signal that is a time-axis signal.

The psychoacoustic model unit 502 determines a size of a per-frequency maximum allowable quantization noise required for a bit allocation process by analyzing a perceptual characteristic of an inputted audio signal. Generally, a quantizing process is performed in the course of coding an audio signal to convert an analog signal to a digital signal. In this quantizing process, a value of error generated from rounding off a continuous value is called a quantization noise. This quantization noise varies according to an extent of bit allocation. In order to express the quantization noise numerically, a signal to quantization noise ratio (SQNR) is used. The signal to quantization noise ratio is expressed as '20×N log 2=6.02×N (dB)'. In this case, 'N' indicates the number of bits allocated per sample. The per-frequency maximum allowable quantization noise can be diagramed into a noise shaping reference. Consequently, if the bit allocation value is raised, the quantization noise is reduced and the probability for the quantization noise to be lowered below the noise shaping reference is raised.

The psychoacoustic model unit 502 includes the coefficient generating unit 502a configured to generate a linear predictive coefficient by performing a linear predictive analysis and to generate a shaping predictive coefficient by applying a weight to the linear predictive coefficient and the noise shaping reference determining unit 502b using the generated shaping predictive coefficient. The noise shaping reference is generated using a shaping predictive coefficient generated by perceptual weighting coding for giving a weight to a linear predictive coefficient derived through linear prediction coding.

The quantizing unit 503 quantizes a result object generated through 'loss coding' for removing a size of quantization noise located below the noise shaping reference determined by the psychoacoustic model unit 502 in the audio signal transformed into the frequency-axis signal by the filter bank 501. The quantizing unit 503 also allocates bits to the quantized signal. The bit allocating process is optimized in a manner that quantization noise generated from the quantizing process becomes smaller than a size of maximum allowable noise of a newly set noise shaping reference in a given bitrate. In particular, quantization bits of MDCT spectrum are allocated to enable the quantization noise to be masked by a signal based on the noise shaping reference in each frame. For example, the frequency-transformed audio signal is divided into a plurality of subband signals. And, it is able to quantize each of the subband signals using the shaping predictive coefficient based noise shaping reference corresponding to each of the subband signals.

The entropy coding unit 504 maximizes a compression ratio of an audio signal by allocating a code to the audio signal quantized and bit-allocated by the quantizing unit 403 according to a use frequency. In particular, the compression efficiency is maximized by allocating a code in a manner of enabling an average code length to be closest to entropy. Namely, a data size is optimized in a manner of representing each symbol or consecutive symbols as a code of a proper length according to a statistical occurrence frequency of data symbols. An average information size called 'entropy' is determined according to the occurrence probability of data symbol. An object of entropy coding is to enable an average code length per symbol to get closer to entropy. In performing the entropy coding, the entropy coding unit 504 is non-limited by a specific method and is able to adopt Huffman coding, arithmetic coding, LZW coding or the like according to a selection made by those who skilled in the art.

The multiplexer 505 receives audio data compressed with high efficiency and side information from the entropy coding unit t04 and then transfers an audio data stream to a decoder of a receiving side.

Meanwhile, audio data coded by the audio coding method of the present invention can be decoded through a decoder in the following manner.

First of all, an audio signal quantized through a demultiplexer of a decoder is received. An audio signal is reconstructed from the quantized audio signal. In this case, the quantized audio signal is generated using a noise shaping reference for a frequency-transformed audio signal. And, the noise shaping reference may be determined using a shaping predictive coefficient generated by applying a weight to a linear predictive coefficient of the audio signal.

Figure 6:
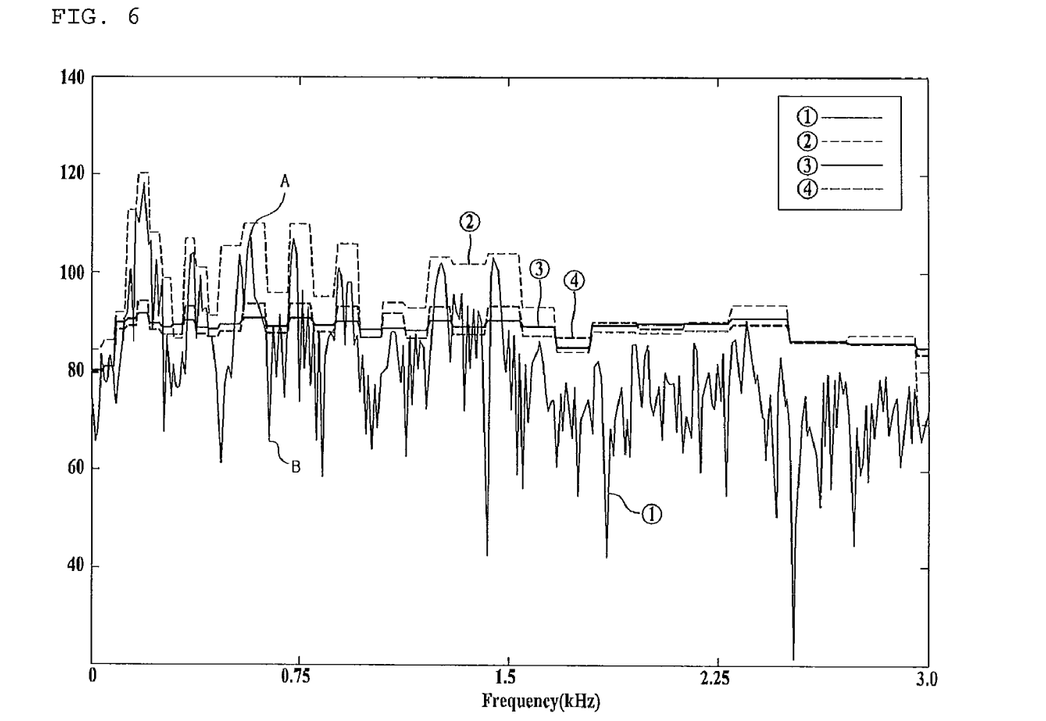
FIG. 6 is a diagram for variations of a noise modified reference value using a psychoacoustic model unit according to another embodiment of the present invention.

FIG. 6 is a diagram for variations of a noise modified reference value using a psychoacoustic model unit according to another embodiment of the present invention.

Referring to FIG. 6, a horizontal axis indicates a frequency and a vertical axis indicates a strength of a signal (dB). A solid line ① indicates a spectrum of an audio input signal. A dotted line ② indicates energy of an audio input signal. A solid line ③ indicates a previous noise shaping reference. And, a dotted line ④ indicates a noise shaping reference newly generated using a linear predictive coefficient calculated by linear predictive analysis and a shaping predictive coefficient generated by applying a given weight to the linear predictive coefficient.

Considering a waveform of an audio input signal on a graph, a top point of a waveform is named a formant and a bottom point of the waveform is named a valley. For example, a point A shown in FIG. 6 becomes a formant and a point B becomes a valley. In case of speech coding, based on the fact that human aural characteristics are sensitive to quantization noise in a valley region of a frequency spectrum, the relatively greater bit number is allocated to the valley region in audio signal coding to cancel out the quantization noise on the valley region. And, the relatively smaller bit number is allocated to a formant region by incrementing a noise shaping reference of the formant region having a relatively greater energy. Therefore, a compression ratio is maintained and an enhanced sound quality can be implemented. In particular, the noise shaping reference of the point A is adjusted higher than that of a previous one and a masking curve value of the point B is adjusted lower than that of a related one. Hence, it is able to raise coding efficiency on a speech signal. Namely, in the step of quantizing a frequency-transformed audio signal, the weight is applicable in direction of increasing the quantization noise of an audio signal corresponding to a formant region of a frequency spectrum for a linear predictive coefficient but decreasing the quantization noise of the audio signal corresponding to a valley region.

For this, the coefficient generating unit 502a shown in FIG. 5 is able to find a transfer function constructed with linear predictive coefficients through linear predictive analysis. A frequency spectrum of this transfer function is diagramed into an envelope of a frequency spectrum for an input signal. This transfer function is named a linear predictive coefficient, which shows a form similar to a noise shaping reference of the psychoacoustic model (PAM) used for a related art audio coding process. Using this feature, the transfer function found by the coefficient generating unit 502a, i.e., a linear predictive coefficient is derived. By adjusting a noise shaping reference experimentally found in the related art based on the derived linear predictive coefficient, it is able to attenuate quantization noise according to a bitrate reduction more efficiently. And, it is able to reduce an amount of operation. Moreover, the coefficient generating unit 502a generates a shaping predictive coefficient by implementing a weighting filter in a manner of applying a proper weighting coefficient to the linear predictive coefficients. Therefore, it is able to adjust weights on formant and valley regions of a spectrum in a simple manner using the shaping predictive coefficient.

If this scheme is applied to an audio coding process, more bits are allocated to a valley region of a spectrum, in which influence of quantization noise is sensitive in aspect of aural aspect, by lowering a noise shaping reference and the bit number allocated to a formant region having a relatively smaller error influence is lowered by raising a noise shaping reference. Hence, it is able to enhance coding performance in aural aspect. In doing so, coding efficiency can be further enhanced by adaptively adjusting a weighting coefficient for adjusting perceptual weighting according to such an input signal characteristic as flatness of a spectrum instead of applying the weighting coefficient identically. Therefore, in improving a noise shaping reference using the linear prediction and weight, it is advantageous that a noise shaping reference can be derived by applying perceptual weighting to a psychoacoustic model without envelope analysis on a spectrum.

Figure 7:
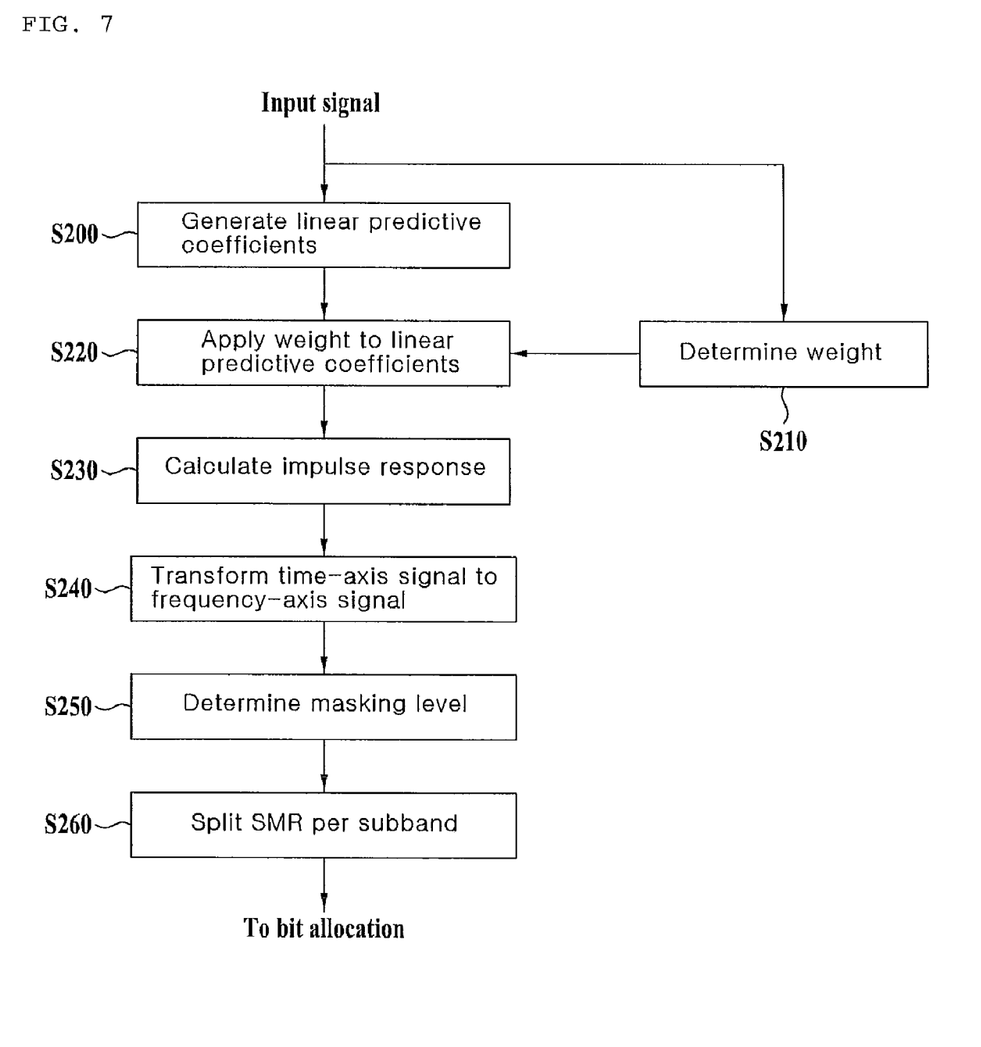
FIG. 7 is a flowchart for a method of generating a noise modified reference value using a psychoacoustic model unit according to another embodiment of the present invention.

FIG. 7 is a flowchart for a method of generating a noise modified reference value using a psychoacoustic model unit according to another embodiment of the present invention.

Referring to FIG. 7, if an audio signal is inputted to the psychoacoustic model unit 502, the coefficient generating unit 502a generates a transfer function constructed with linear predictive coefficients using a linear prediction coding [S200]. A frequency spectrum of the transfer function is diagramed as an envelope of a frequency spectrum for an input signal. This transfer function is called a linear predictive coefficient and has a form similar to that of a noise shaping reference of the psychoacoustic model (PAM) used for a related art audio coding process. The coefficient generating unit 502a receives an input of the audio signal and then determines a weighting coefficient suitable for linear predictive coefficients [S210]. Subsequently, the noise shaping reference determining unit 502b generates an envelops corrected by applying the weighting coefficient determined in the step S210 to the former envelope of the transfer function constructed with the linear predictive coefficients found in the step S200 [S220]. The noise shaping reference determining unit 502b then calculates an impulse response of the envelope generated in the step S220 [S230]. In this case, the impulse response plays role as a sort of filtering. The noise shaping reference determining unit 502b transforms a time-axis signal into a frequency-axis signal by performing FFT on the envelope filtered in the step S230 [S240]. The noise shaping reference determining unit 502b determines a masking level to set a noise shaping reference to the envelope transformed into the frequency-axis signal [S250]. Finally, the noise shaping reference determining unit 502b then splits a signal to mask ratio (SMR) per subband [S260].

Through the above process, a weighting filter is implemented by applying a weighting coefficient to psychoacoustic coefficients. Compared to a related art noise shaping reference, a value of a formant region of a noise shaping reference is raised on a frequency spectrum and a value of a valley region is lowered. Therefore, it is able to allocate a higher bit number to the valley region relatively.

Meanwhile, it is able to enhance coding efficiency using warped linear predictive coding (warped LP analysis) instead of using the linear predictive coding (linear predictive analysis) in the step S200. In particular, the warped linear predictive coding is performed to reduce a data rate in a high-efficiency audio coder in a manner of compressing a signal by a core audio coding scheme of applying a psychoacoustic model of the present invention up to a low frequency band and applying bandwidth extension or spectral band replication (SBR) to the rest of high-frequency components using low frequency information. In case of this high-frequency coder, a psychoacoustic model based noise shaping reference is necessary up to a specific low frequency band only. In case of using the warped linear predictive coding, it may be able to increase envelope modeling efficiency by increasing frequency resolution of a specific frequency band.

The audio signal encoder shown in FIG. 4 or FIG. 5 is operable in a device loaded with a music signal encoder and a speech signal encoder both. In case that a music characteristic is dominant in a specific frame or segment of a downmix signal, the audio signal encoder encodes the downmix signal according to a music coding scheme. In this case, the music signal encoder may correspond to a modified discrete transform (MDCT) encoder.

In case that a speech characteristic is dominant in a specific frame or segment of a downmix signal, the audio signal encoder encodes the downmix signal according to a speech coding scheme. Meanwhile, it is able to improve a linear predictive coding scheme used for a speech signal encoder into a scheme proposed by the present invention. In case that a harmonic signal has high redundancy on a time axis, it can be modeled by linear prediction for predicting a current signal from a past signal. In this case, it is able to raise coding efficiency if a linear predictive coding scheme is applied. Meanwhile, the speech signal encoder may correspond to a time-domain encoder.

Figure 8:
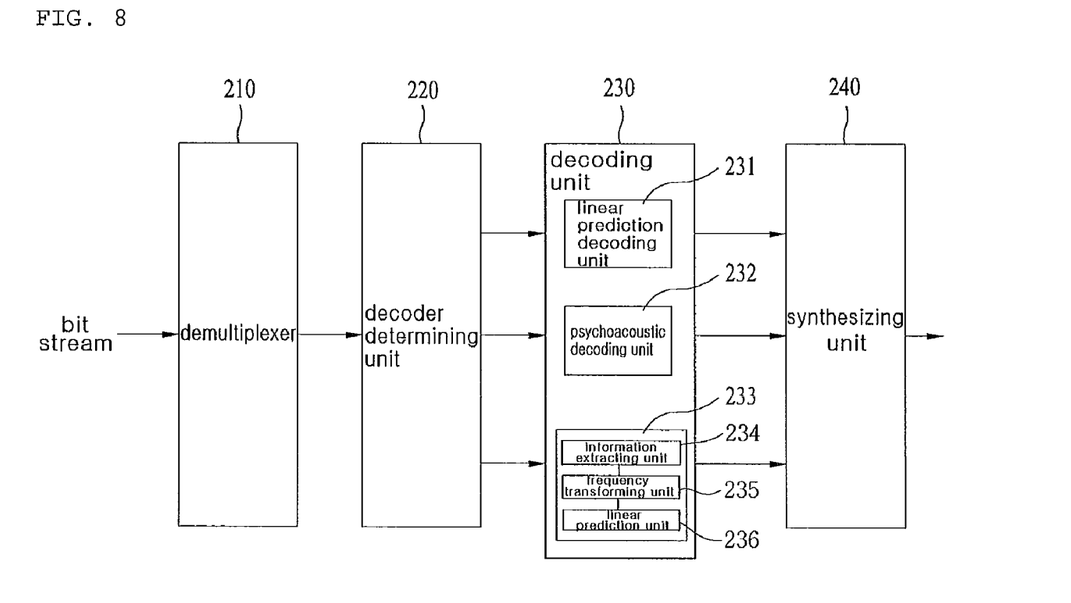
FIG. 8 is a block diagram of an audio decoding apparatus according to one embodiment of the present invention.

FIG. 8 is a block diagram of an audio decoding apparatus according to one embodiment of the present invention.

Referring to FIG. 8, a decoding apparatus is able to reconstruct a signal from an inputted bitstream by performing a process reverse to the coding process performed by the coding apparatus described with reference to FIG. 1. In particular, the decoding apparatus can include a demultiplexer 210, a decoder determining unit 220, a decoding unit 230 and a synthesizing unit 240. The decoding unit 230 can include a plurality of decoding units 231, 232 and 233 to perform decoding by different schemes, respectively. And, they are operated under the control of the decoder determining unit 220. In more particular, the decoding unit 230 can include a linear prediction decoding unit 231, a psychoacoustic decoding unit 232 and a mixed signal decoding unit 233. Moreover, the mixed signal decoding unit 233 can include an information extracting unit 234, a frequency transforming unit 235 and a linear prediction unit 236.

The demultiplexer 210 extracts a plurality of coded signals and side information from an inputted bitstream. In this case, the side information is extracted to reconstruct the signals. The demultiplexer 210 extracts the side information, which is included in the bitstream, e.g., first type information and second type information (just included if necessary) and then transfers the extracted side information to the decoder determining unit 220.

The decoder determining unit 220 determines one of decoding schemes within the decoding units 231, 232 and 233 from the received first type information and the received second type information (just included if necessary). Although the decoder determining unit 220 is able to determine the decoding scheme using the side information extracted from the bitstream, if the side information does not exist within the bitstream, the decoder determining unit 220 is able to determined scheme by an independent determining method. This determining method can be performed in a manner of utilizing the features of the aforesaid signal classifying unit (cf. '100' in FIG. 1).

The linear prediction decoder 231 within the decoding unit 230 is able to decode a speech signal type of an audio signal. The psychoacoustic decoder 233 decodes a music signal type of an audio signal. And, the mixed signal decoder 233 decodes a speech & music mixed type of an audio signal. In particular, the mixed signal decoder 233 includes an information extracting unit 234 extracting spectral data and a linear predictive coefficient from an audio signal, a frequency transforming unit 235 generating a residual signal for linear prediction by inverse-transforming the spectral data, and a linear prediction unit 236 generating an output signal by performing linear predictive coding on the linear predictive coefficient and the residual signal.

The decoded signals are reconstructed into an original audio signal by being synthesized together by the synthesizing unit 240.

Figure 11:
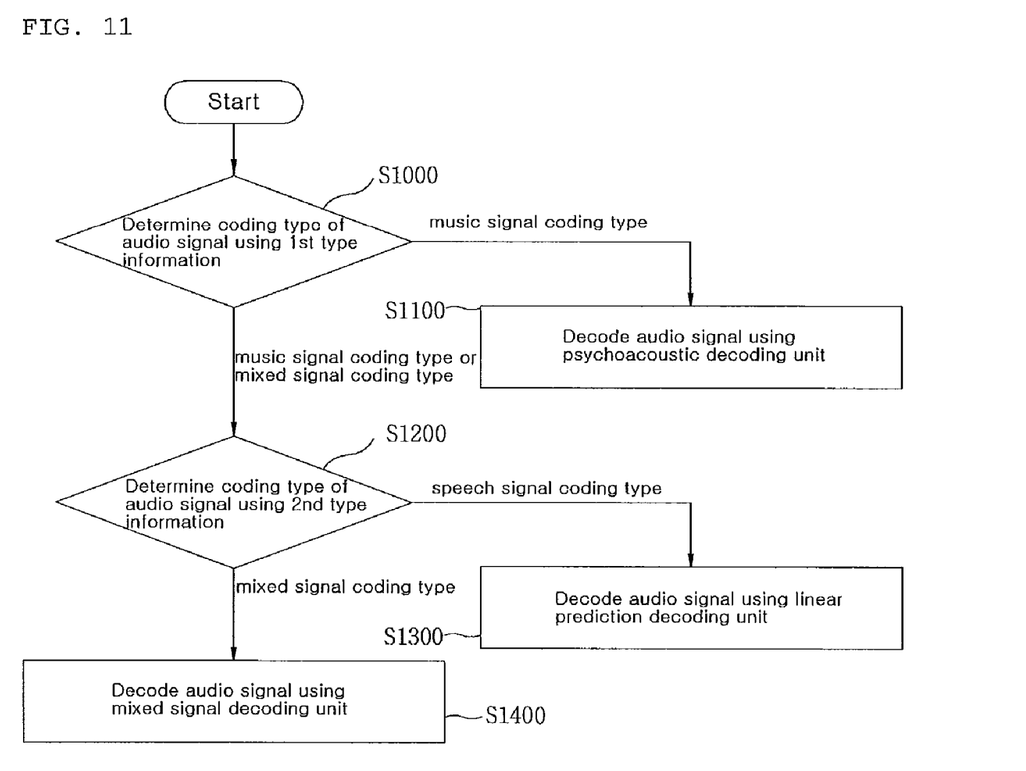
FIG. 11 is a flowchart for an audio decoding method according to one embodiment of the present invention.

In the following description, a decoding method according to the present invention is explained in detail with reference to a flowchart shown in FIG. 11.

First of all, the demultiplexer 210 extracts first type information and second type information (if necessary) from an inputted bitstream. The decoder determining unit 220 determines a coding type of a received audio signal using the first type information of the extracted information in the first place [S1000]. If a music signal is received, the psychoacoustic decoding unit 232 within the decoding unit 230 is utilized. A coding scheme applied per frame or subframe is determined according to the first type information. Decoding is then performed by applying a suitable coding scheme [S1100].

If it is determined that a coding type of the received audio signal is not a music signal coding type using the first type information, the decoder determining unit 220 determines whether the coding type of the received audio signal is a speech signal coding type or a mixed signal coding type using the second type information [S1200].

If the second type information means the speech signal coding type, the coding scheme applied per frame or subframe is determined by utilizing coding identification information extracted from the bitstream in a manner of utilizing the linear prediction decoding unit 231 within the decoding unit 230. Decoding is then performed by applying a suitable coding scheme [S1300].

If the second type information means the mixed signal coding type, the coding scheme applied per frame or subframe is determined by utilizing coding identification information extracted from the bitstream in a manner of utilizing the mixed signal decoding unit 233 within the decoding unit 230. Decoding is then performed by applying a suitable coding scheme [S1400].

Besides, as a post-processing of the audio signal decoding process using the linear prediction decoding unit 231, the psychoacoustic decoding unit 232 and the mixed signal decoding unit 233, a bandwidth extension decoding unit can perform a frequency band extending process [not shown in the drawing]. The frequency band extending process is performed in a manner that the bandwidth extension decoding unit generates spectral data of a different band (e.g., a high frequency band) from a portion of the spectral data or the whole spectral data by decoding bandwidth extension information included in an audio signal bitstream. In doing so, units having similar characteristics can be grouped into a block in extending the frequency band. This is the same method of generating an envelope region by grouping type slots (or, samples) having a common envelope (or an envelope characteristic).

Figure 9:
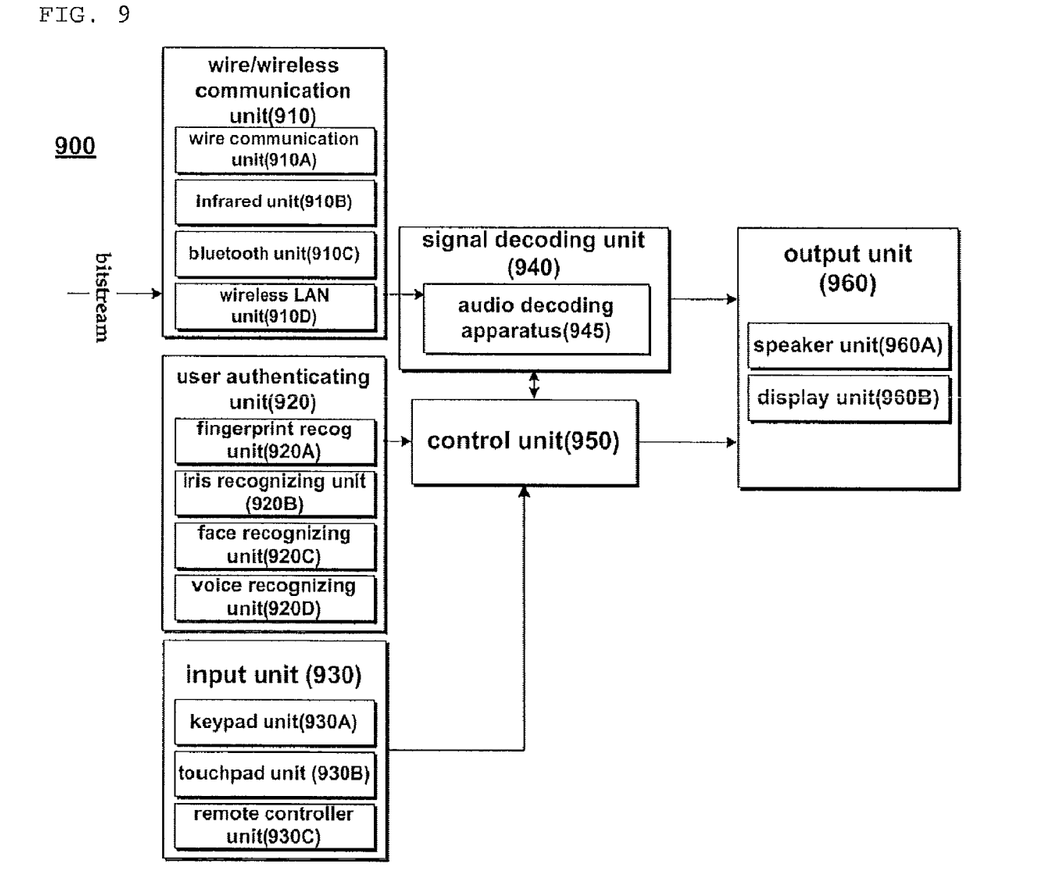
FIG. 9 is a diagram for a configuration of a product implemented with an audio decoding apparatus according to an embodiment of the present invention.
Figure 10:
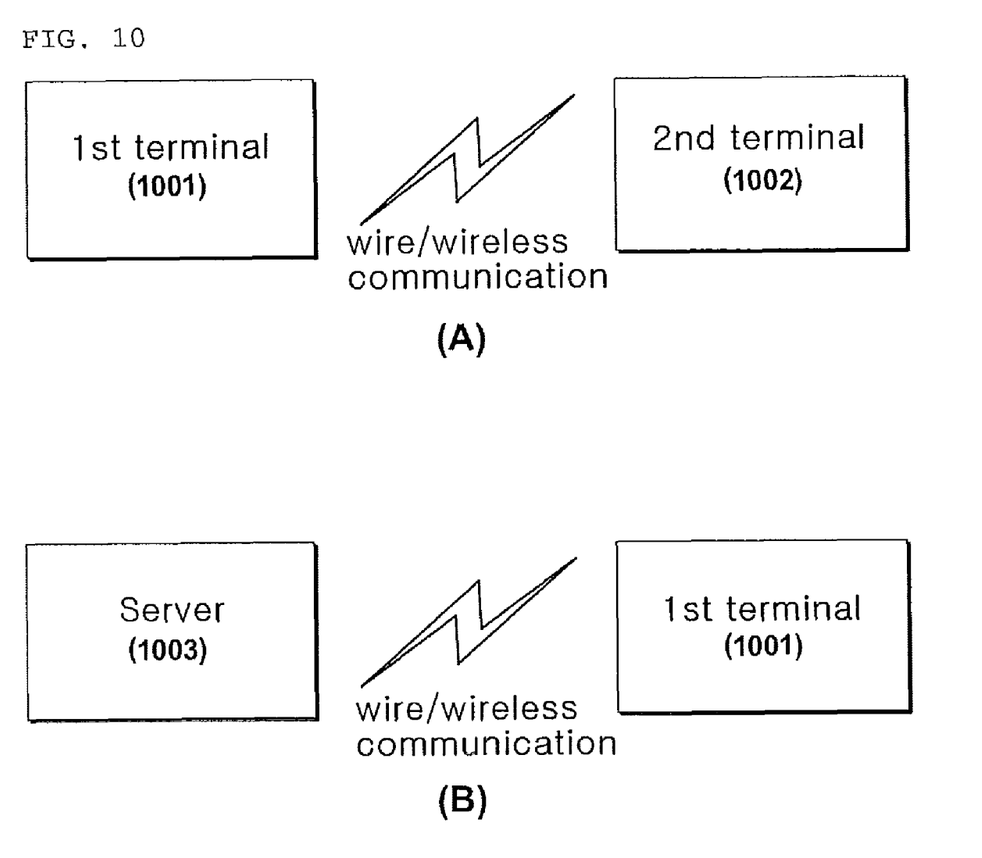
FIG. 10 is a diagram for an example of relations between products implemented with an audio decoding apparatus according to an embodiment of the present invention.

FIG. 9 is a diagram for a configuration of a product implemented with an audio decoding apparatus according to an embodiment of the present invention. And, FIG. 10 is a diagram for an example of relations between products implemented with an audio decoding apparatus according to an embodiment of the present invention.

Referring to FIG. 9, a wire/wireless communication unit 910 receives a bitstream through a wire/wireless communication system. In particular, the wire/wireless communication unit 910 can include at least one of a wire communication unit 910A, an IR (infrared) communication unit 910B, a Bluetooth unit 910C and a wireless LAN communication unit 910D.

A user authenticating unit 920 receives an input of user information and then performs user authentication. The user authenticating unit 920 can include at least one of a fingerprint recognizing unit 920A, an iris recognizing unit 920B, a face recognizing unit 920C and a speech recognizing unit 920D. The user authenticating unit 920 is able to perform the user authentication in a manner of inputting fingerprint/iris/face contour/speech information to the corresponding recognizing unit 920A/920B/920C/920D, converting the inputted information to user information and then determining whether the user information matches previously-registered user data.

An input unit 930 is an input device for enabling a user to input various kinds of commands. The input unit 930 is able to include at least one of a keypad unit 930A, a touchpad unit 930B and a remote controller unit 930C, by which the present invention is non-limited. A signal decoding unit 940 may includes audio decoding apparatus 945 which may be audio decoding apparatus described with reference to FIG. 8. The audio decoding apparatus 945 decides at least one of different schemes and performs decoding using at least one of a linear prediction decoding unit, a psychoacoustic decoding unit and a mixed signal decoding unit. The signal decoding unit 940 outputs an output signal by decoding a signal using a decoding unit corresponding to the signal characteristic.

A control unit 950 receives input signals from input devices and controls all processes of the signal decoding unit 940 and an output unit 960. And, the output unit 960 is an element for outputting the output signal generated by the signal decoding unit 940 or the like. The output unit 960 is able to include a speaker unit 960A and a display unit 960B. If an output signal is an audio signal, it is outputted to a speaker. If an output signal is a video signal, it is outputted via a display.

FIG. 10 shows relations between a terminal and a server corresponding to the products shown in FIG. 9. Referring to (A) of FIG. 10, it can be observed that a first terminal 1001 and a second terminal 1002 are able to bi-directionally communicate with each other via a wire/wireless communication unit to exchange data and/or bitstreams. Referring to (B) of FIG. 10, it can be observed that a server 1003 and a first terminal 1001 are able to perform wire/wireless communications.

An audio signal processing method according to the present invention can be implemented into a program to be run in a computer and can be stored in a computer-readable recording medium. And, multimedia data having a data structure according to the present invention can be stored in a computer-readable recording medium as well. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). Moreover, a bitstream generated by the encoding method is stored in a computer-readable recording medium or can be transmitted via wire/wireless communication network.

Accordingly, the present invention provides the following effects or advantages.

First of all, the present invention sorts audio signals into different types and provides an audio coding scheme suitable for characteristics of the sorted audio signals, thereby enabling more efficient compression and reconstruction of an audio signal.

While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents.

What is claimed is:

1. In an audio signal processing apparatus including an audio decoder, a method of processing an audio signal, comprising the steps of:
   identifying whether a coding type of the audio signal is a music signal coding type using first type information;
   if the coding type of the audio signal is not the music signal coding type, identifying whether the coding type of the audio signal is a speech signal coding type or a mixed signal coding type using second type information;
   if the coding type of the audio signal is the mixed signal coding type, extracting spectral data and a linear predictive coefficient from the audio signal;
   generating a residual signal for linear prediction by performing inverse frequency conversion on the spectral data; and
   reconstructing the audio signal by performing linear prediction coding on the linear predictive coefficient and the residual signal,
   wherein if the coding type of the audio signal is the music signal coding type, the first type information is used only and
   wherein if the coding type of the audio signal is the speech signal coding type or the mixed signal coding type, both of the first type information and the second type information are used.

2. The method of claim 1, further comprising the steps of:
   if the coding type of the audio signal is the mixed signal coding type, reconstructing a high-frequency band signal using a low-frequency band signal of the reconstructed audio signal; and
   generating a plurality of channels by upmixing the reconstructed audio signal.

3. The method of claim 1, wherein the audio signal includes a plurality of subframes and wherein the second type information exists by a unit of the subframe.

4. The method of claim 1, wherein if the coding type of the audio signal is the music signal coding type, the audio signal comprises a frequency-domain signal, wherein if the coding type of the audio signal is the speech signal coding type, the audio signal comprises a time-domain signal, and wherein if the coding type of the audio signal is the mixed signal coding type, the audio signal comprises an MDCT-domain signal.

5. The method of claim 1, the linear predictive coefficient extracting step comprises the steps of:
   extracting a linear predictive coefficient mode; and
   extracting the linear predictive coefficient having a variable bit size corresponding to the extracted linear predictive coefficient mode.

6. An apparatus for processing an audio signal, comprising:
   a demultiplexer extracting first type information and second type information from a bitstream;
   a decoder determining unit identifying whether a coding type of the audio signal is a music signal coding type using first type information, the decoder, if the coding type of the audio signal is not the music signal coding type, identifying whether the coding type of the audio signal is a speech signal coding type or a mixed signal coding type using second type information, the decoder then determining a decoding scheme;
   an information extracting unit, if the coding type of the audio signal is the mixed signal coding type, extracting spectral data and a linear predictive coefficient from the audio signal;
   a frequency transforming unit generating a residual signal for linear prediction by performing inverse frequency conversion on the spectral data; and
   a linear prediction unit reconstructing the audio signal by performing linear prediction coding on the linear predictive coefficient and the residual signal,
   wherein if the coding type of the audio signal is the music signal coding type, the first type information is used only and
   wherein if the coding type of the audio signal is the speech signal coding type or the mixed signal coding type, both of the first type information and the second type information are used.

7. The apparatus of claim 6, further comprising:
   a bandwidth extension decoding unit, if the coding type of the audio signal is the mixed signal coding type, reconstructing a high-frequency band signal using a low-frequency band signal of the reconstructed audio signal; and
   a channel extension decoding unit generating a plurality of channels by upmixing the reconstructed audio signal.

8. The apparatus of claim 6, wherein the audio signal includes a plurality of subframes and wherein the second type information exists by a unit of the subframe.

9. The apparatus of claim 6, wherein if the coding type of the audio signal is the music signal coding type, the audio signal comprises a frequency-domain signal, wherein if the coding type of the audio signal is the speech signal coding type, the audio signal comprises a time-domain signal, and wherein if the coding type of the audio signal is the mixed signal coding type, the audio signal comprises an MDCT-domain signal.

10. The apparatus of claim 6, wherein the information extracting unit extracting the linear predictive coefficient checks a linear predictive coefficient mode and then extracts the linear predictive coefficient having a variable bit size corresponding to the extracted linear predictive coefficient mode.

11. In an audio signal processing apparatus including an audio coder for processing an audio signal, a method of processing the audio signal, comprising the steps of:
   determining a coding type of the audio signal;
   if the audio signal is a music signal, generating first type information indicating that the audio signal is coded into a music signal coding type;
   if the audio signal is not the music signal, generating second type information indicating that the audio signal is coded into either a speech signal coding type or a mixed signal coding type;
   if the coding type of the audio signal is the mixed signal coding type, generating a linear predictive coefficient by performing linear prediction coding on the audio signal;
   generating a residual signal for the linear prediction coding;
   generating a spectral coefficient by frequency-transforming the residual signal; and
   generating an audio bitstream including the first type information, the second type information, the linear predictive coefficient and the residual signal,
   wherein if the coding type of the audio signal is the music signal coding type, the first type information is generated only and
   wherein if the coding type of the audio signal is either the speech signal coding type or the mixed signal coding type, both of the first type information and the second type information are generated.

12. The method of claim 11, wherein the audio signal includes a plurality of subframes and wherein the second type information is generated per the subframe.

13. An apparatus for processing the audio signal, comprising:
- a signal classifying unit determining a coding type of the audio signal, the signal classifying unit, if the audio signal is a music signal, generating first type information indicating that the audio signal is coded into a music signal coding type, the signal classifying unit, if the audio signal is not the music signal, generating second type information indicating that the audio signal is coded into either a speech signal coding type or a mixed signal coding type;
- a linear prediction modeling unit, if the coding type of the audio signal is the mixed signal coding type, generating a linear predictive coefficient by performing linear prediction coding on the audio signal;
- a residual signal extracting unit generating a residual signal for the linear prediction coding; and
- a frequency transforming unit generating a spectral coefficient by frequency-transforming the residual signal, wherein if the coding type of the audio signal is the music signal coding type, the first type information is generated only and wherein if the coding type of the audio signal is either the speech signal coding type or the mixed signal coding type, both of the first type information and the second type information are generated.

14. The apparatus of claim 13, wherein the audio signal includes a plurality of subframes and wherein the second type information is generated per the subframe.

15. The apparatus of claim 13, comprising:
- a coefficient generating unit, if the coding type of the audio signal is the music signal coding, generating the linear predictive coefficient using the linear prediction coding, the coefficient generating unit giving a weight to the linear predictive coefficient; and
- a reference determining unit generating a noise shaping reference using the weight-given linear predictive coefficient.

* * * * *